United States Patent [19]

Dague et al.

[11] Patent Number: 5,525,228
[45] Date of Patent: Jun. 11, 1996

[54] TEMPERATURE-PHASED ANAEROBIC WASTE TREATMENT PROCESS

[75] Inventors: Richard R. Dague; Sandra K. Kaiser, both of Ames, Iowa; William L. Harris, Chandler, Ariz.

[73] Assignee: Iowa State University Research Foundation, Inc., Ames, Iowa

[21] Appl. No.: 316,860

[22] Filed: Oct. 3, 1994

Related U.S. Application Data

[63] Continuation of Ser. No. 124,871, Sep. 22, 1993, abandoned.
[51] Int. Cl.[6] .................................................... C02F 3/06
[52] U.S. Cl. ........................ 210/603; 210/612; 210/616; 210/617

[58] Field of Search ........................ 210/603, 604, 210/612–618

[56] References Cited

U.S. PATENT DOCUMENTS

| | | | |
|---|---|---|---|
| 4,321,141 | 3/1982 | Messing | 210/603 |
| 4,351,729 | 4/1982 | Witt | 210/603 |
| 4,551,250 | 11/1985 | Motper et al. | 210/603 |
| 4,735,724 | 4/1988 | Chynoweth et al. | 210/603 |
| 5,228,995 | 7/1993 | Stover | 210/603 |

Primary Examiner—Thomas G. Wyse
Attorney, Agent, or Firm—Henderson & Sturm

[57] ABSTRACT

A method of treating a waste stream including the steps of feeding the stream through a thermophilic anaerobic reactor and then a mesophilic anaerobic reactor operated in series.

18 Claims, 4 Drawing Sheets

NOTE: TOTAL VOLUME OF EACH SYSTEM IS THE SUM OF THE VOLUMES GIVEN

TEMPERATURE-PHASED ANAEROBIC WASTE TREATMENT PROCESS

This is a continuation of application Ser. No. 08/124,871 filed on Sep. 22, 1993 now abandoned.

TECHNICAL FIELD

This invention relates to anaerobic treatment of wastewaters, and more particularly to a temperature-phased anaerobic process.

BACKGROUND ART

Anaerobic biological treatment has been in existence since the 1910's when it was first used for the treatment of municipal sewage sludge. Over the last twenty-five years, a number of new anaerobic processes have been developed for the treatment of industrial wastes, as well as for conventional sludge digestion.

Industrial waste pretreatment is becoming commonly viewed as a cost-savings measure by generating industries, in that it often costs less to pretreat wastes than to pay municipal sewer usage fees. Anaerobic processes are now being considered by many industries as an attractive alternative for industrial waste pretreatment.

The pioneering work on the anaerobic filter was performed at Stanford University by Young for his doctoral research under McCarty, and was presented in detail in 1969. [Young, J. C., and P. L. McCarty "The anaerobic filter for waste treatment." JWPCF, 41, 5, R160–R173 (1969)].

The first anaerobic filters were described by Young as completely submerged, 12-liter, laboratory-scale reactors which were filled with 1.0 to 1.5 inch quartzite stone (bed porosity of 0.42). The reactors were continuously-fed in a upflow mode at 25° C.

Two substrates were used, a mixture of proteins and carbohydrates, and a mixture of acetic and propionic acids. Waste strengths ranged from 1,500 mg/L to 6,000 mg/L at hydraulic retention times (HRTs) ranging from 4.5 hrs to 72 hrs, resulting in organic loadings ranging from 0.43 g COD/L/day to 3.40 g COD/L/day. Treatment success was based primarily on COD removals, based on measured influent and effluent CODs. COD removals ranged from a high of 93.4% at the 72 hr HRT at a loading of 0.43 g COD/L/day, to a low of 36.7% removal at the 4.5 hr HRT at a loading of 3.4 g COD/L/day.

From the initial research on the anaerobic filter, Young and McCarty stated several observations and advantages of the anaerobic filter as compared to other anaerobic treatment systems including:

1. The anaerobic filter is ideal for the treatment of soluble waste streams.
2. Biological solids accumulate in the anaerobic filter leading to long solids retention times (SRTs), and low effluent total suspended solids (TSS).
3. Because of the long SRTs possible, dilute wastes can be treated successfully at nominal temperatures (<37° C.).

Shortly after Young and McCarty's early work on the anaerobic filter, Plummer applied the anaerobic filter treatment process to an actual food processing waste, consisting mainly of carbohydrates. [Plummer, A. H., Jr., Maline, J. F., Jr., and W. W. Ekenfelder, Jr. "Stabilization of a low-solids carbohydrate waste by an anaerobic submerged filter." Proceedings of the 23rd Industrial Waste Conference, Purdue University, Lafayette, Ind. (1968)]. Instead of using rock packing media, Plummer used a plastic ring and saddle media. This provided a much higher filter bed porosity (0.70 porosity vs. 0.42) than was the case for Young's rock-filled filter. The higher bed porosity left more physical space in the reactor for the retention of anaerobic biomass.

Plummer's filters were operated mesophilically at organic loadings of 1.6 g COD/L/day to 10.3 g COD/L/day at HRTs ranging from 13 hrs to 83 hrs, resulting in COD removals ranging from 41 to 93.5%. To avoid the possibility of liquid short-circuiting, Plummer suggested effluent recycling.

The anaerobic filter process was applied to a pharmaceutical waste by Jennett and Dennis in 1975. [Jennett, J. C., and N. D. Dennis, Jr. "Anaerobic filter treatment of pharmaceutical waste." JWPCF, 47, 1, 104–121 (1975)]. The pharmaceutical waste was low in suspended solids and had an average COD of 16,000 mg/l. The reactors were filled with 1.0 to 1.5 inch gravel, and had a 14 liter empty bed volume. HRTs of 12 hrs to 48 hrs were studied at 37° C. and applied organic loadings ranging from 0.2 g COD/L/day to 3.5 g COD/L/day. COD removal efficiencies ranged from 94 to 98%. An important observation made by Jennet and Dennis was that bacteria collected on and between the interstitial spaces of the gravel media.

Chain and DeWalle utilized an anaerobic filter for the treatment of acidic landfill leachate which had a pH of 5.4 and a COD of 54,000 mg/L. [Chian, E. S. K., and DeWalle, F. B., "Treatment of High Strength Acidic Wastewaters with a Completely Mixed Anaerobic Filter." Water Research, Vol. 11 (1977)]. They practiced effluent liquid recycle in order to help neutralize the pH of the acidic leachate. They also used plastic media which provided for a high filter bed porosity of 0.94.

The anaerobic filter was used to treat shellfish processing wastewaters by Hudson. [Hudson, J. W., Pohland, F. G., and Pendergrass, R. P. "Anaerobic packed column treatment of shellfish processing wastewaters." Proceedings of the 34th Industrial Waste Conference, Purdue University, Lafayette, Ind. (1984)]. Two different types of packing media were used, including readily-available oyster shells and stone media, resulting in bed porosities of 0.82 and 0.53, respectively. This was an important study which illustrated how filter bed porosity may affect wastewater treatment. The oyster shell media filter with the higher bed porosity provided superior treatment as compared to the stone media, with COD removals of 81%.

In 1980, Dague reported on the use of anaerobic filters to treat a high-strength grain processing waste. [Dague, R. R. "Principles of anaerobic filter design." Presented at the 26th annual Great Plains Wastewater Design Conference, Omaha, Nebr., Mar. 23, 1982.] Two temperatures were utilized, 22° C. and 35° C., at applied organic loadings of 2.4 g COD/L/day. COD removal efficiencies were 75% at 22° C., and 90% at 35° C. The organic loading was increased to 5.6 g COD/L/day for the 35° C. filter, but treatment was unstable due to pH fluctuations in the raw waste.

Stevens and van den Berg used the anaerobic filter process to treat food processing wastes at 37° C. [Stevens, T. G., and L. van den Berg "Anaerobic treatment of food processing wastes using a fixed-film reactor." Proceedings of the 36th Industrial Waste Conference, Purdue University, Lafayette, Ind. (1981)]. Two wastes were utilized including a bean-blanching wastewater, and a caustic tomato-peeling wastewater, which was neutralized to a pH of 9.5 prior to anaerobic treatment.

The single filter was operated in the upflow mode with the bean-blanching waste and in the downflow mode with the bean-blanching waste and the tomato-peeling waste. Little change in treatment was observed when the filter was instantaneously switched from the bean-blanching waste to the tomato-peeling waste.

In 1984, Guiot and van den Berg described a modified anaerobic filter, termed the upflow blanket filter (UBF), or hybrid filter. [Guiot, S. R. and L. van den Berg "Dynamic performance of an anaerobic reactor combining an upflow sludge blanket and a filter for the treatment of sugar waste." Proceedings of the 39th Industrial Waste Conference, Purdue University, Lafayette, Ind. 1984]. In their design, the bottom two-thirds of the reactor consisted of an open space where a sludge blanket formed. The top one-third of the reactor contained conventional plastic media. They tested a synthetic waste consisting mainly of sucrose in which applied organic loadings of up to 22 g COD/L//day resulted in 95% soluble COD removal efficiencies.

Many more studies have been conducted using anaerobic filters. The anaerobic filter has been applied mainly to soluble waste streams using a variety of synthetic as well as actual industrial wastes.

There are no known two-stage anaerobic treatment processes in which a thermophilic anaerobic filter is connected in series to a mesophilic anaerobic filter. The majority of the relevant literature deals with two-stage systems designed for enhanced phase optimization.

In 1971, Pohland and Ghosh first proposed a two-phase system for the separation of the acidogenic and methanogenic phases of anaerobic treatment. [Pohland, F. G., and S. Ghosh "Developments in anaerobic stabilization of organic wastes—the two-phase concept." *Env. Letters*, 1, 4, 255–266 (1971)].

Their system consisted of two completely-mixed reactors connected in series for waste stabilization. They noted that by separating the acid-forming organisms from the methanogenic organisms, optimal growth environments could be maintained for each population. By the use of kinetic control using the appropriate dilution rates, they proposed that the rapid-growing acidogens would be predominate in the first stage, forming volatile acids. The slower-growing methanogens would be washed out of the first stage and predominate in the second stage where they could convert volatile acids produced in the first stage to methane gas. They noted that the key to successful treatment was near-complete phase separation.

In 1985, Ghosh compared the two-stage process to single-stage digestion for the anaerobic treatment of sewage sludge. [Ghosh, S. "Improved sludge gasification by two-phase anaerobic digestion." *J.Env. Eng,.* 113, 1265–1284 (1985)]. Continuously-mixed reactors were used, and temperature variations of mesophilic to mesophilic, mesophilic to thermophilic, and thermophilic to thermophilic were applied for the first and second stages, respectively. Ghosh noted that the two-stage systems showed superior performance when compared to the single-stage system, especially at high organic loadings and low HRTs.

Tanaka and Matsuo treated a dilute milk waste stream using a two-stage system which consisted of a continuously-mixed reactor connected in series to a methanogenic anaerobic filter at 37° C. [Tanaka, S. and T. Matsuo "Treatment characteristics of the two phase anaerobic digestion system using an upflow filter." *Wat.Sci.Tech.,* 18, 217–224 (1986)]. At a system HRT of 4.4 days, 92% COD removals were achieved at a low organic loading of 1.5 g COD/L/day. They observed more successful phase separation when the acidogenic continuously-mixed reactor was operated at a 1-day HRT rather than a 2-day HRT. In an analysis of the acidogenic effluent from the first stage, it was observed that carbohydrates were more readily degraded than the proteins or lipids present in the milk waste stream.

In 1986, Lo and Liao were the first to utilize the two-stage process for an agricultural waste, screened dairy manure. [Lo, K. V., and P. H. Liao "Thermophilic anaerobic digestion of screened dairy manure using a two-phase process." *Energy in Agriculture*, 5, 249–255 (1986)]. They compared one-stage and two-stage systems at 55° C. The two-stage system consisted of a 6-liter completely-mixed reactor operated at HRTs of 1.3 to 1.5 days connected to a 4-liter anaerobic filter operated at a 1-day HRT. The single-stage system consisted of a 4-liter anaerobic filter operated at a 1-day HRT. Better performance was observed in the single-stage system for the screened dairy manure.

In 1990, Hanaki and others compared single-stage and two-stage anaerobic treatment of an oily cafeteria wastewater at 20° C. [Hanaki, K. Matsuo, T., and K. Kumazaki "Treatment of oily cafeteria wastewater by single-phase and two phase anaerobic filter." *Wat. Sci. Tech.,* 22, 3/4, 299–306 (1990)]. Similar to previous research, the two stage system consisted of a completely-mixed reactor connected in series to an anaerobic filter. The cafeteria wastewater contained approximately 30% lipids, and had a COD of 1,300 mg/L to 2,500 mg/L. Slightly better COD removals were observed in the single-stage filter as compared to the two-stage system.

Aoki and Kawase reported on the use of a two-stage process at a thermophilic temperature to digest sewage sludge. [Aoki, N., and M. Kawase "Development of high-performance thermophilic two-phase digestion process." *Wat.Sci.Tech.,* 23, 1147–1156 (1991)]. Their research was slightly different in that a thermal conditioning pretreatment step was applied at 90° C. for one hour using a proteolytic enzyme. The two-stage system consisted of a 70° C. completely-mixed acidogenic reactor connected to a 55° C. anaerobic filter. Their system obtained a 58% volatile solids reduction at a system HRT of 3.7 days.

Other reports in the literature deal with multi-stage designs which were not developed for phase optimization.

In 1973, El-Shafie and Bloodgood described an experiment in which six anaerobic filters were connected in series for the treatment of Metrecal (vanilla flavor) at 30° C. [El-Shafie, A., and D. E. Bloodgood "Anaerobic treatment in a multiple upflow filter system." *JWPCF,* 45, 11, 2345–2357 (1973)].

In their system, the six reactors were filled with 1 to 1.5 inch gravel media and had a working volume of 2.6 liters each. The Metrecal waste stream had a COD of 10,000 mg/l, and was applied at the rate of 1 liter per hour, resulting in an effective load on the first anaerobic filter of 41 g COD/L/day. The retention time in each of the six filters was three hours, resulting in a system HRT of 18 hours for the combined six filters. System COD removals averaged 76. El-Shafie and Bloodgood observed that there was an exponential decrease in biological activity from the first to the last filter.

Howerton and Young investigated a unique two-stage cyclic operation of anaerobic filters using a synthetic alcohol stillage waste comprised mainly of ethanol and sucrose. [Howerton, D. F., and J. D. Young "Two-stage cyclic operation of anaerobic filters." JWPCF, 59, 8, 788,794 (1987)].

In their system, two 370-liter anaerobic filters were connected in series, with the first reactor termed the lead reactor, and the second reactor termed the follow reactor. As a part of their study, after 136 days of continuous operation of the filters at 30° C., the waste flow was reversed, with the follow reactor becoming the lead reactor. At organic loadings of 4 g COD/L/day and 8 g COD/L/day, using system HRTs of 36 hrs and 18 hrs, COD removals of 98% to 99% were observed.

At Iowa State University, Harris conducted a comparative study of mesophilic and thermophilic anaerobic filters for his doctoral research under Dague. [Harris, W. L. Comparative performance of anaerobic filters at mesophilic and thermophilic temperatures." Doctoral dissertation, Library, Iowa State University (1992)].

The laboratory-scale anaerobic filters had clean-bed volumes of 16.8 liters. Non-fat dried milk was used as the substrate. The mesophilic and thermophilic filters were operated at 35° C. and 56° C., respectively. Harris observed that the thermophilic reactors produced a lower quality effluent than the mesophilic reactors at high organic loadings.

DISCLOSURE OF THE INVENTION

The present invention provides a method of treating a waste stream including the steps of feeding the stream through a thermophilic anaerobic reactor and then a mesophilic anaerobic reactor operated in series.

An object of the present invention is the provision of an improved method of biologically treating a waste stream.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

The following examples are illustrative of the best mode for carrying out the invention. They are obviously not to be construed as limitative of the invention since various other embodiments can readily be evolved in view of the teachings provided herein.

EXAMPLE 1

During Applicants' research comparing the performance of upflow anaerobic biofilters operated at temperatures of 35° C. and 56° C. [Harris, W. L. "Comparative performance of anaerobic filters at mesophilic and thermophilic temperatures." Doctoral dissertation, Library, Iowa State University (1992)], the thermophilic reactors tended to produce a lower quality effluent than the mesophilic reactors, especially at higher organic loadings. It was observed that the concentrations of volatile acids in the effluent of the thermophilic reactors was high when the COD load was in excess of 25 g/L/day. These high effluent volatile acids, of course, are reflected in a declining COD removal efficiency in the thermophilic reactors.

As a result of the poor effluent quality from the thermophilic biofilters, it was decided to operate the reactors in series (thermophilic followed by mesophilic) to determine whether or not such operation would result in increased removals of the high concentrations of volatile acids in the thermophilic effluent. This mode of operation resulted in a dramatic increase in the overall performance of the anaerobic biofilter system with COD removal efficiencies approaching 100%.

Figure 1:
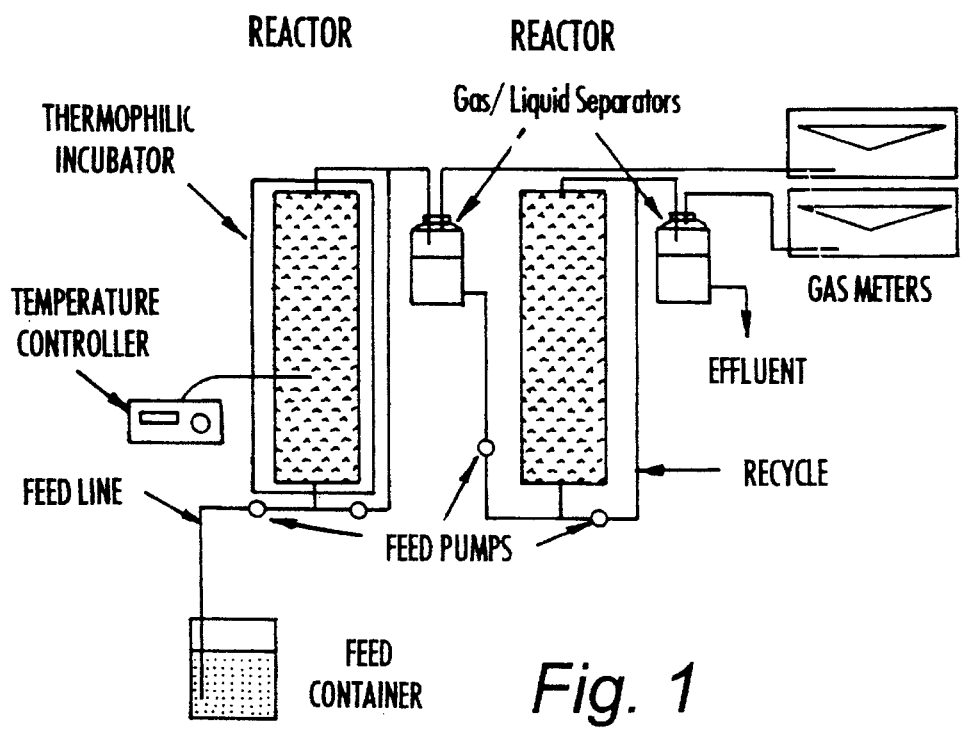
FIG. 1 is a schematic illustration of the temperature-phased anaerobic reactor system used to carry out the method of the present invention.

The initial research on the temperature-phased anaerobic biofilter (TPAB) process was conducted using two laboratory-scale anaerobic biofilters (FIG. 1), each having a cleanbed volume of 16.8 liters. The reactors were fed a synthetic substrate made from non-fat dry milk supplemented with essential nutrients and trace metals. The reactors were operated continuously in the upflow mode with the effluent from the thermophilic unit being fed into the mesophilic unit. The temperatures of the thermophilic and mesophilic reactors were maintained at 56° C. and 35° C., respectively. It is to be understood that the thermophilic reactor could be operated in the range of about 45° C. to 75° C. and that mesophilic reactor could be operated in the range of about 20° C. to 45° C. Overall system hydraulic retention times (HRTs) of 24 hr and 48 hr were studied. System organic loadings ranged from 4.13 to 24.75 g COD/L/day. The effective loading range on the first-stage thermophilic reactor was 8.26 to 49.5 g COD/L/day.

The reaction conditions include the presence of a mixed consortium of anaerobic microorganisms such as hydrolytic, acetogenic and methanogenic bacteria.

The thermophilic first stage (56° C.) receives raw organic waste and is capable of both organic matter conversion to simpler organic fatty acids, and to some degree organic matter stabilization to methane.

The mesophilic second phase (35° C.) can be thought of as a polishing step. Organic matter present mainly as simple organic fatty acids received from the first stage are converted into methane gas, providing for complete waste stabilization. The result is a superior effluent, low in organic matter and suspended solids.

Figure 2:
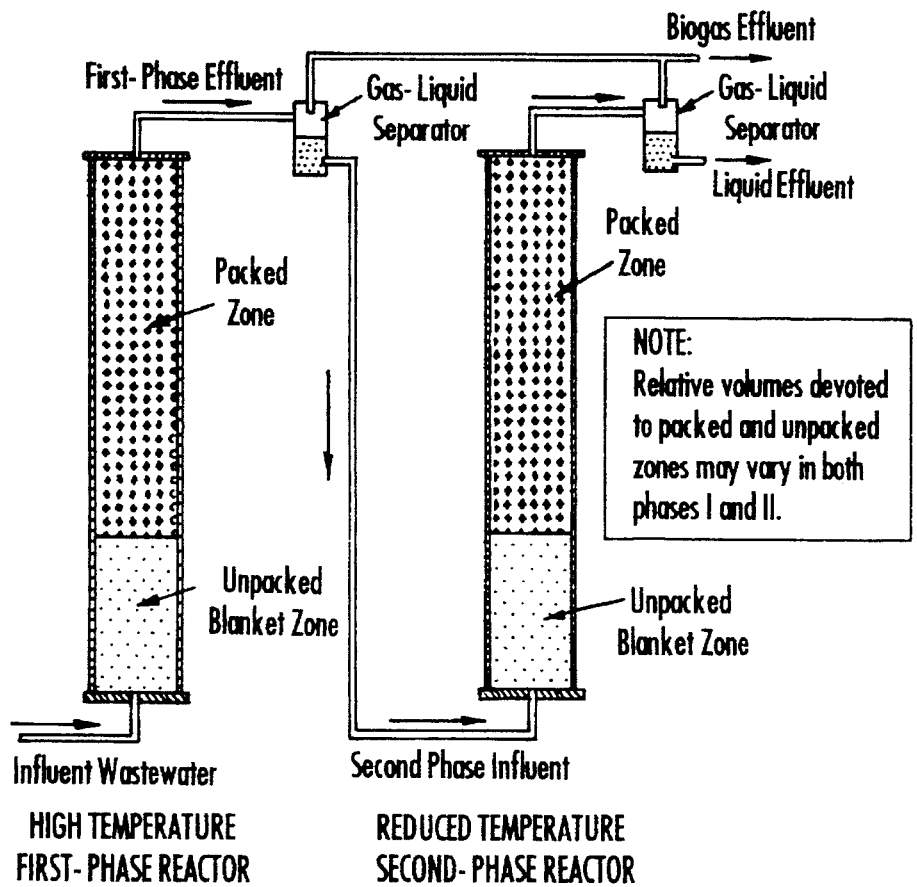
FIG. 2 is a schematic illustration of an alternate reactor system using hybrid columns.
Figure 3:
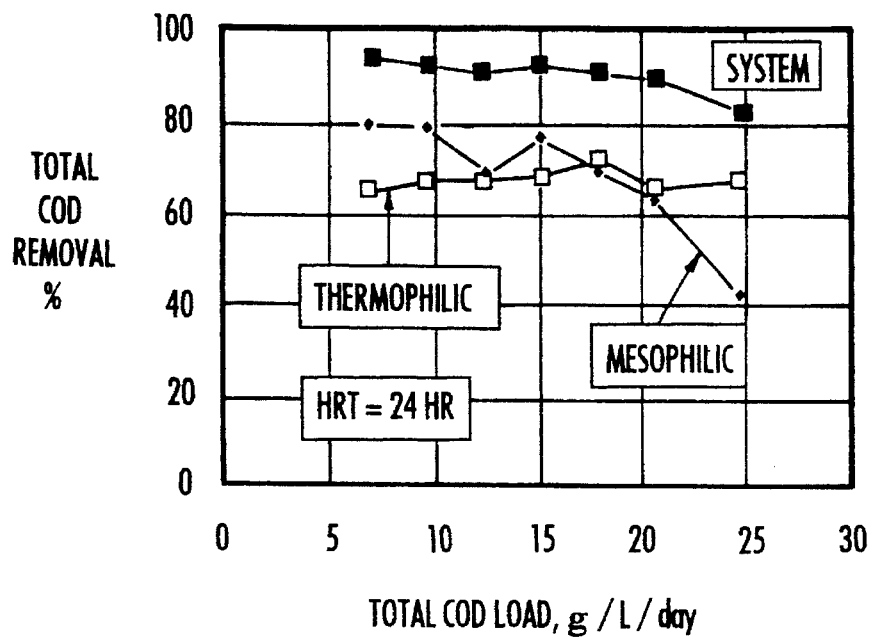
FIG. 3 is a graphical representation of the system performance at a twenty-four hour hydraulic retention time.
Figure 4:
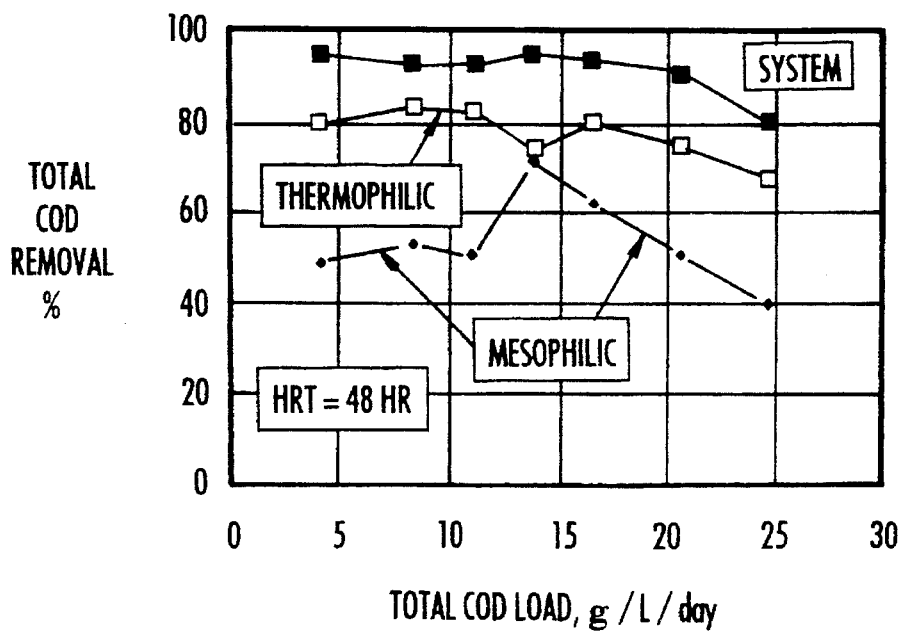
FIG. 4 is a similar graphical representation at a forty-eight hour hydraulic retention time.

Superior treatment performance was observed at both the 24 hr and 48 hr HRTs, as shown in FIGS. 3 and 4. System total COD removals of 90% or higher were observed at system loadings up to 20 g COD/L/day. For the 48 hr HRT system, the 20 g COD/L/day loading corresponds to an influent COD concentration of 40,000 mg/L. This illustrates the capability of the TPAB process to successfully treat very high strength wastes. FIG. 2 depicts a system using hybrid columns as an alternate to the fully packed columns depicted in FIG. 1.

EXAMPLE 2

As a result of these positive findings, the decision was made to expand the study to evaluate the performance of laboratory anaerobic filters operated in the thermophilic-mesophilic series mode for a variety of hydraulic retention times (HRT) and organic loadings.

Figure 5:
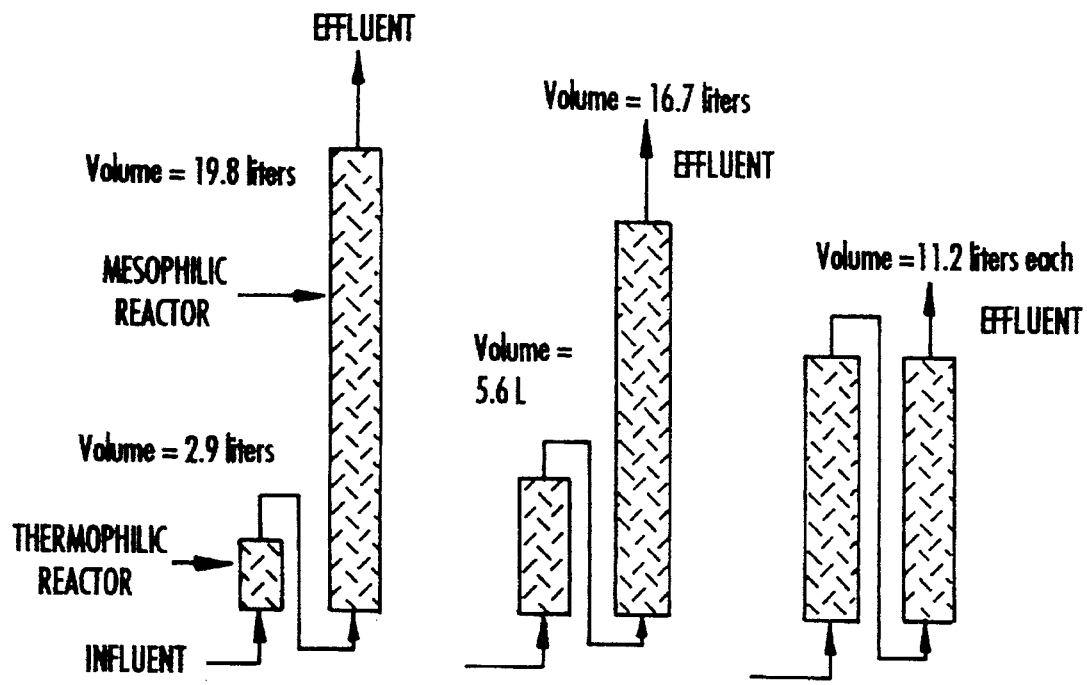
FIG. 5 is a schematic view illustrating three systems having varying hydraulic retention times wherein each system has the same HRT but mesophilic and thermophilic stages have varying HRTs.

As a part of the expanded study, three new laboratory reactor systems were constructed with relative volumes of the thermophilic and mesophilic reactors selected to enable the evaluation of a range of organic loadings and HRTs and to evaluate the optimum size ratio between the thermophilic and mesophilic stages. The three reactor systems are illustrated in FIG. 5. The total empty-bed volume of the systems (thermophilic plus mesophilic) ranged from 22.3 L to 22.7 L. The ratios of the thermophilic/mesophilic reactor volumes were different for each system. This enabled the variation of COD load on the first-stage thermophilic reactors while feeding exactly the same volume and substrate COD concentration to each system. The HRTs in the thermophilic and mesophilic phases as well as for the total system are shown in Table 1.

TABLE 1

Hydraulic retention times for the three TPAB Systems.

| System HRT hours | Thermophilic Stage hours (volume, L) | Mesophilic Stage hours (volume, L) |
|---|---|---|
| 24 | 3 (2.9) | 21 (19.8) |
|  | 6 (5.6) | 18 (16.7) |
|  | 12 (11.2) | 12 (11.2) |
| 48 | 6 (2.9) | 42 (19.8) |
|  | 12 (5.6) | 36 (16.7) |
|  | 24 (11.2) | 24 (11.2) |

The COD loadings evaluated for the total system and for the thermophilic reactors in the systems are shown in Table 2.

TABLE 2

COD loadings for the three TPAB systems and for the thermophilic first stage. (System HRT = 48 hr.)
Organic Loadings, g COD/L/day

|  | First-Phase Thermophilic Reactors | | |
|---|---|---|---|
| Total System | No. 1 (2.9 L) (6 hr HRT) | No. 2 (5.6 L) (12 hr HRT) | No. 3 (11.2 L) (24 hr HRT) |
| 1 | 8 | 4 | 2 |
| 2 | 16 | 8 | 4 |
| 3 | 24 | 12 | 6 |
| 4 | 32 | 16 | 8 |
| 5 | 40 | 20 | 10 |
| 6 | 48 | 24 | 12 |
| 7 | 56 | 28 | 14 |
| 8 | 64 | 32 | 16 |
| 9 | 72 | 36 | 18 |
| 10 | 80 | 40 | 20 |

Figure 6:
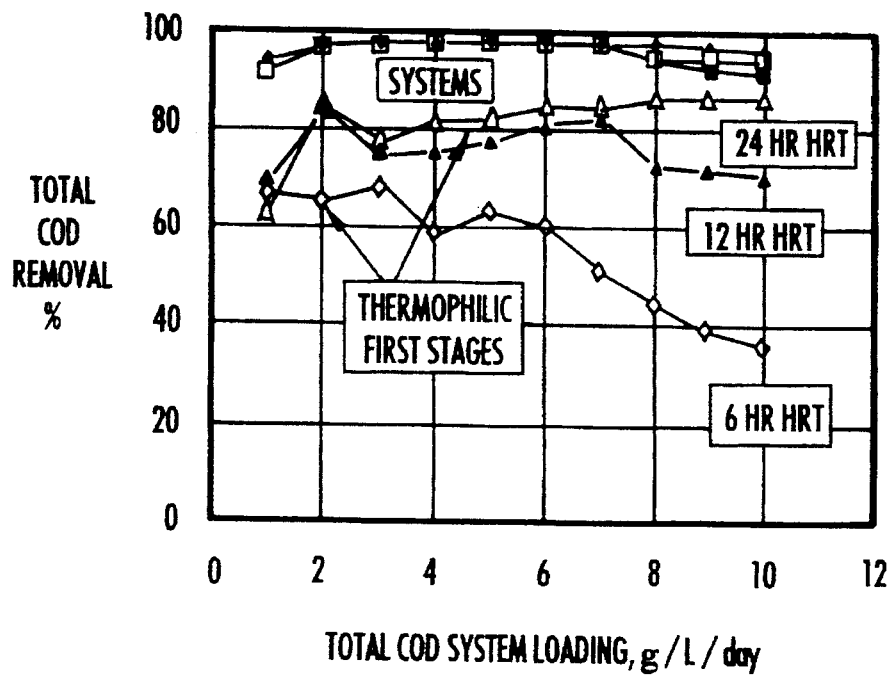
FIG. 6 is a graphical representation of the performance of the three systems illustrated in FIG. 5 at a 48 hr system HRT.

The three TPAB systems have been evaluated at the 48 hr system HRT. For the system consisting of a 24 hr HRT thermophilic reactor followed by a 24 hr HRT mesophilic reactor, total COD removals in excess of 98% were achieved at system organic loads ranging from 2 to 10 g COD/L/day (FIG. 6). For the system consisting of a 6 hr HRT thermophilic unit followed by a 42 hr HRT mesophilic unit, total COD removals in excess of 94 % were achieved. Similar removals were achieved in the system consisting of a 12 hr HRT thermophilic reactor followed by a 36 hr HRT mesophilic reactor.

Figure 7:
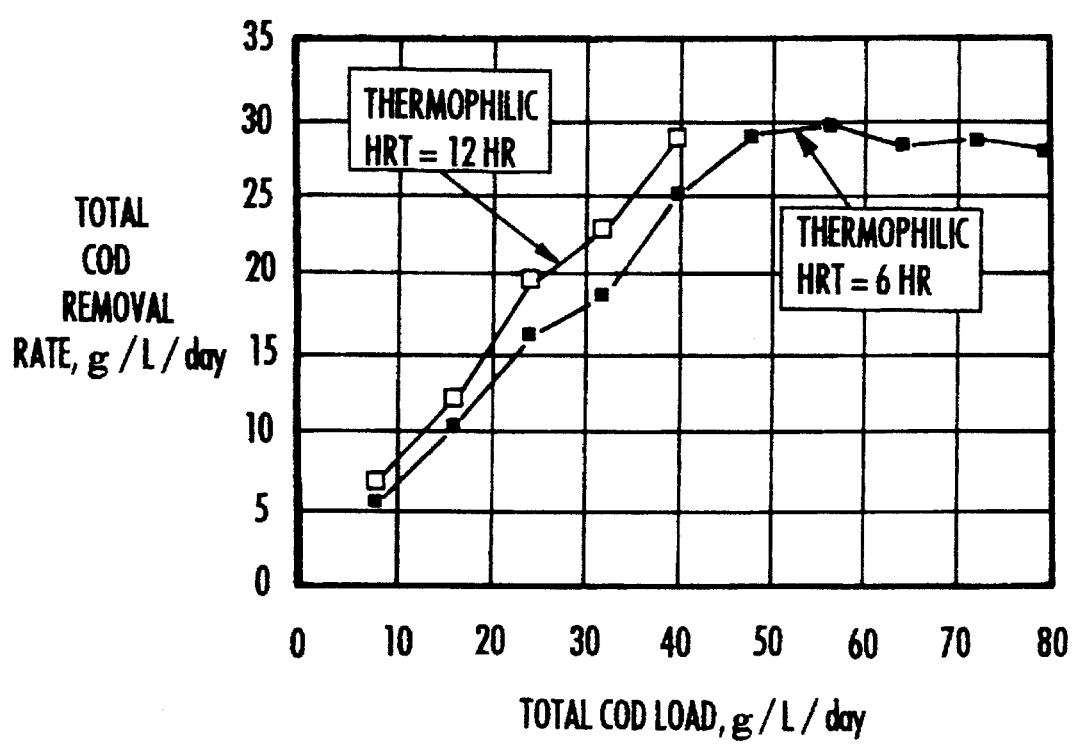
FIG. 7 is a graphical representation of the COD removal rates for the thermophilic stages of the systems at the 48 hr system HRT.

Comparing the thermophilic stages of the TPAB systems, it was observed that the 6 hr HRT thermophilic phase had reached maximum total COD removals at an effective loading of 48 g COD/L/day, as shown in FIG. 7. It was observed that although the maximum COD removal capacity for the 6 hr HRT thermophilic stage was reached, the overall two-phase system continued to perform well. The 12 hr HRT thermophilic stage was observed to have consistently higher COD removal rates than the 6 hr HRT thermophilic stage at effective organic loadings ranging from 8 to 40 g COD/L/day.

The methane production of the thermophilic and mesophilic units were observed separately. The 24 hr HRT thermophilic unit and the 12 hr HRT thermophilic unit were observed to have near equal methane production at system organic loading rates ranging from 1 to 5 g COD/L/day. The 6 hr HRT thermophilic unit had consistently lower methane production than the 24 or 12 hr HRT units. Saturation loading was evident for the 6 hr HRT thermophilic unit at the 7 g COD/L/day system loading, as methane production failed to increase with further increases in system loading.

Total methane production for both phases of the three TPAB systems was compared to theoretical methane production. Theoretical methane production is 0.35 liters at STP (14.7 psi, 0° C.) of methane produced per gram of COD destroyed. It was observed that there was no significant difference in total methane production between the three TPAB systems, and all systems compared closely to the theoretical methane production.

Studies are continuing at the 24 hr system HRT at system organic loadings ranging from 10 to 20 g COD/L/day, corresponding to influent COD concentrations of 10,000 mg/L to 20,000 mg/L. It is predicted that the shorter system HRT and the higher organic loadings will result in greater differences in performance between the three TPAB systems. This may reveal optimal size ratios between the thermophilic and mesophilic phases, leading to the most effective application of the TPAB process.

Conclusions from the studies of Example 2 are:
1. The "temperature-phased anaerobic biofilter" (TPAB) process is a promising new anaerobic treatment technology with the ability to achieve higher efficiencies of organic removals than is generally possible for single-stage anaerobic filter systems.
2. The TPAB process has been demonstrated to be effective at 24 hr and 48 hr system HRTs.
3. Nearly equal treatment performance at the 48 hr system HRT has been observed using three different reactor size ratios.

BIOFILTER MEDIA

In the temperature-phased anaerobic biofilter process, the biofilter media allows for efficient retention of the microorganisms within the contained reactor. The microorganisms have been shown in various research studies to attach to the media, and to be entrapped in the interstitial spaces between the media. The retention of microorganisms is very important in anaerobic treatment processes because the key group of organisms for waste stabilization, the methanogens, are known to be fairly slow-growing. Biofilter media may be of two general types. The first type is random packed media, in which usually polypropylene ring media is placed into the reactors. Various other types of materials have been used for random packing including rocks, ceramics, shells, and polyurethane foam blocks. The second type of biofilter media is modular vertical or cross-flow media, in which blocks of prefabricated media are placed inside of a reactor.

In the temperature-phased anaerobic biofilter demonstration experiment of Example 2, the media used is a random-pack polypropylene ring media. The media is fully-packed into the experimental reactors. The rings are 1.59 cm. (0.625 in.) plastic media. The random packing of this media provides a filter bed porosity of 0.89. The specific surface area of this media is 344 m$^2$/m$^3$, as reported by the manufacturer.

PROCESS VARIATIONS

The demonstration experiment of Example 2 involves the use of anaerobic biofilters with random-packed media. In addition to biofilters, other types of anaerobic reactor systems can be utilized in the temperature-phased anaerobic reactor process including suspended growth systems.

One important suspended growth system which may be utilized is the anaerobic sequencing batch reactor (U.S. Pat. No. 5,185,079) process, or ASBR. The ASBR is a batch-fed system in which the microorganisms are maintained in the reactor without attachment media. In the ASBR process, a series of steps take place for waste degradation including: the feed step in which new liquid wastes enter into the reactor, the react step in which continuous or intermittent mixing is employed and waste stabilization takes place, the settle step where the organisms internally settle to the bottom of the reactor, and the decant step where the stabilized liquid effluent is removed. The series of these four steps is called a sequence, and numerous sequences may take place during a 24 hr period.

The temperature-phased anaerobic reactor process may be employed using two ASBRs connected in series, a thermophilic ASBR connected to a mesophilic ASBR, as defined by the process.

The temperature-phased anaerobic reactor process may also be employed using continuously or intermittently-mixed, continuously or intermittently-fed reactors. In this configuration, which is envisioned to be employed in a conventional municipal wastewater treatment plant, the wastes continuously enter the thermophilic first phase where important pathogen destruction can take place along with partial waste stabilization. The waste stream then passes to the mesophilic second phase for further stabilization.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

We claim:

1. A method of treating a waste stream comprising the steps of: feeding the waste stream into a thermophilic anaerobic reactor;

maintaining thermophilic anaerobic reaction conditions of the waste stream in the thermophilic anaerobic reactor for a predetermined hydraulic retention time of up to about 24 hours to generate a first biogas effluent comprising methane, and a first liquid effluent;

feeding the first liquid effluent from the thermophilic anaerobic reactor into a mesophilic anaerobic reactor; and maintaining mesophilic anaerobic reaction conditions of the waste stream in the mesophilic anaerobic reactor for a predetermined hydraulic retention time of up to about 42 hours to generate a second biogas effluent comprising methane, and a second liquid effluent, wherein COD removal of up to about 70 to 100 percent is achieved.

2. The method of claim 1 wherein the thermophilic reaction conditions include a reaction temperature ranging from about 45° C. to about 75° C.

3. The method of claim 2 wherein the thermophilic reaction conditions include a reaction temperature of about 56°.

4. The method of claim 1 wherein the mesophilic reaction conditions include a reaction temperature ranging from about 20° C. to about 45° C.

5. The method of claim 4 wherein the mesophilic reaction conditions includes a reaction temperature of about 35° C.

6. The method of claim 12 wherein the thermophilic anaerobic reactor includes a fully-packed column.

7. The method of claim 1 wherein the mesophilic anaerobic reactor includes a fully-packed column.

8. The method of claim 6 wherein the mesophilic anaerobic reactor includes a fully-packed column.

9. The method of claim 1 wherein the thermophilic anaerobic reactor is a hybrid column including an unpacked blanket zone and a packed zone.

10. The method of claim 1 wherein the mesophilic anaerobic reactor is a hybrid column including an unpacked blanket zone and a packed zone.

11. The method of claim 9 wherein the mesophilic anaerobic reactor is a hybrid column including an unpacked blanket zone and a packed zone.

12. The method of claim 1 wherein the thermophilic anaerobic reactor is a suspended growth system.

13. The method of claim 1 wherein the mesophilic anaerobic reactor is a suspended growth system.

14. The method of claim 12 wherein the mesophilic anaerobic reactor is a suspended growth system.

15. The method of claim 8 wherein the fully-packed column is packed with random-packed media.

16. The method of claim 8 wherein the fully-packed column is packed with modular media.

17. The method of claim 11 wherein the packed zone is packed with random-packed media.

18. The method of claim 11 wherein the packed zone is packed with modular media.

* * * * *

UNITED STATES PATENT AND TRADEMARK OFFICE
CERTIFICATE OF CORRECTION

PATENT NO. : 5,525,228

DATED : June 11, 1996

INVENTOR(S) : Richard R. Dague, et al.

It is certified that error appears in the above-indentified patent and that said Letters Patent is hereby corrected as shown below:

column 1, line 30, delete "JWPCF" and insert --*JWPCF*--.

column 2, line 14, delete "JWPCF" and insert --*JWPCF*--.

column 3, line 15, delete the third occurrence of ",".

column 3, line 48, delete "*Eng,.*" and insert --*Eng.,*--.

column 4, line 17, delete "Hanaki, K." and insert --Hanaki, K.,-- column 4, line 19, delete "two phase" and insert --two-phase--.

column 4, line 20, delete "two stage" and insert --two-stage--.

UNITED STATES PATENT AND TRADEMARK OFFICE
CERTIFICATE OF CORRECTION

PATENT NO. : 5,525,228
DATED : June 11, 1996
INVENTOR(S) : Richard R. Dague, et al.

It is certified that error appears in the above-indentified patent and that said Letters Patent is hereby corrected as shown below:

column 4, line 52, delete "76" and insert --76%--.

column 4, line 59, delete "JWPCF" and insert --*JWPCF*--.

column 5, line 3, delete "Comparative" and insert --"Comparative--.

In the Claims at column 10, line 22, (line 1 of Claim 6) delete "claim 12" and insert --claim 1--.

Signed and Sealed this

Seventeenth Day of December, 1996

*Attest:*

BRUCE LEHMAN

*Attesting Officer*   *Commissioner of Patents and Trademarks*

REEXAMINATION CERTIFICATE (4095th)

United States Patent
Dague et al.

[11] B1 5,525,228
[45] Certificate Issued May 30, 2000

[54] TEMPERATURE-PHASED ANAEROBIC WASTE TREATMENT PROCESS

[75] Inventors: Richard R. Dague; Sandra K. Kaiser, both of Ames, Iowa; William L. Harris, Chandler, Ariz.

[73] Assignee: Iowa State University Research Foundation, Inc., Ames, Iowa

Reexamination Request:
No. 90/005,453, Aug. 17, 1999

Reexamination Certificate for:
Patent No.: 5,525,228
Issued: Jun. 11, 1996
Appl. No.: 08/316,860
Filed: Oct. 3, 1994

Certificate of Correction issued Dec. 17, 1996.

Related U.S. Application Data

[63] Continuation of application No. 08/124,871, Sep. 22, 1993, abandoned.

[51] Int. Cl.[7] ............................................. C02F 3/06
[52] U.S. Cl. ........................... 210/603; 210/612; 210/616; 210/617
[58] Field of Search ..................... 210/603, 609, 210/612–618

[56] References Cited

U.S. PATENT DOCUMENTS

| | | | |
|---|---|---|---|
| 4,321,141 | 3/1982 | Messing | 210/603 |
| 4,351,729 | 9/1982 | Witt | 210/603 |
| 4,551,250 | 11/1985 | Morper et al. | 210/603 |
| 4,735,724 | 4/1988 | Chynoweth et al. | 210/603 |
| 5,228,995 | 7/1993 | Stover | 210/603 |

OTHER PUBLICATIONS

Mitsdörffer, 1990, Great Britain, Stabilization & Disinfection of Sewage Sludge by Two–Stage Anaerobic Thermophilic/Mesophilic Digestion.

Mitsdörffer, 1990, Germany, Zweistufig–thermophile/mesophile Faulung.

Perot et al., 1989, France, Optimisation of Sludge Anaerobic Digestion by Separation of Hydrolysis–Acidification & Methanogenesis.

Oles et al, 1997, Germany, Full Scale Experience of Two Stage Thermophilic/Mesophilic Sludge Digestion.

References from 12th Annual Residuals and Biosolids Management Conference.

*Primary Examiner*—Thomas G. Wyse

[57] ABSTRACT

A method of treating a waste stream including the steps of feeding the stream through a thermophilic anaerobic reactor and then a mesophilic anaerobic reactor operated in series.

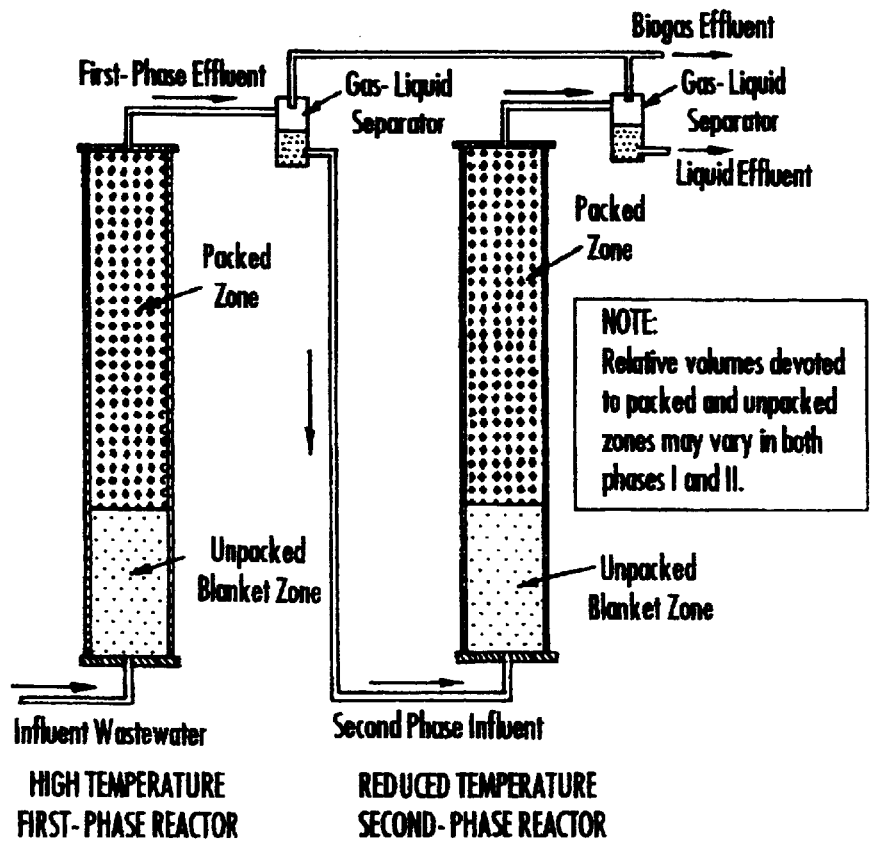

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18 is confirmed.

New claim 19 is added and determined to be patentable.

*19. A method of treating a waste stream comprising the steps of:*

*feeding the waster stream into a thermophilic anaerobic reactor;*

*maintaining thermophilic anaerobic reaction conditions of the waste stream in the thermophilic anaerobic reactor for a predetermined hydraulic retention time of up to about 24 hours to generate a first biogas effluent comprising methane, and a first liquid effluent;*

*feeding the first liquid effluent from the thermophilic anaerobic reactor into a mesophilic anaerobic reactor; and*

*maintaining mesophilic anaerobic reaction conditions of the waste stream in the mesophilic anaerobic reactor for a predetermined hydraulic retention time of up to about 24 hours to generate a second biogas effluent comprising methane, and a second liquid effluent, wherein COD removal of up to about 70 to 100 percent is achieved.*

\* \* \* \* \*